United States Patent [19]

Ward

[11] 4,117,566
[45] Oct. 3, 1978

[54] VEHICULAR LUG NUT CLEANING DEVICE

[75] Inventor: Timothy J. Ward, New Orleans, La.

[73] Assignee: The Raymond Lee Organization, Inc., New York, N.Y.

[21] Appl. No.: 791,391

[22] Filed: Apr. 27, 1977

[51] Int. Cl.² ............................................. A47L 13/16
[52] U.S. Cl. ................... 15/244 R; 15/210 R
[58] Field of Search ............... 15/210 R, 211, 244 R, 15/244 A; 51/205 R; 81/125, 177 D, 185; 401/9, 11

[56] References Cited

U.S. PATENT DOCUMENTS

| 1,489,696 | 4/1924 | Campbell | 81/177 D UX |
|---|---|---|---|
| 2,424,509 | 7/1947 | Singer | 15/244 R X |
| 2,701,491 | 2/1955 | Ross | 81/125 X |
| 2,713,693 | 7/1955 | Johnson | 15/97 R |
| 2,744,279 | 5/1956 | Heber | 15/244 R X |
| 2,832,245 | 4/1958 | Burrows | 81/125 |
| 3,067,450 | 12/1962 | Mirth | 15/244 R X |

FOREIGN PATENT DOCUMENTS

| 1,168,829 | 9/1958 | France | 15/244 R |
|---|---|---|---|
| 176,157 | 6/1935 | Switzerland | 15/244 R |
| 226,358 | 12/1924 | United Kingdom | 81/125 |

*Primary Examiner*—Daniel Blum
*Attorney, Agent, or Firm*—Howard I. Podell

[57] ABSTRACT

A sponge forms an inner shaftway with interiorly projecting ribs to engage the sides of a lug nut, a shaft with a bottom plate attached to the bottom of the shaft is attached by adhesive material to the sponge body and a handle attached perpendicularly to the distal end of the shaft are used to rotate the sponge on the lug nut; the shaft can be made of round cross section with a hexagonal central shaftway or can be made of hexagonal cross section for strength of the shaft.

3 Claims, 5 Drawing Figures

VEHICULAR LUG NUT CLEANING DEVICE

I have invented a new and novel vehicular lug nut cleaning device. My device may have interior ribs or teeth to more readily and effectively abrade and remove debri from the sides of each of the lug nuts used to secure a wheel to a vehicle. Furthermore, the shaft used in forming this device may be made with an octagonal shaft for strength and resistance to torque deformations.

My invention can be understood in view of the accompanying figures.

Figure 1:
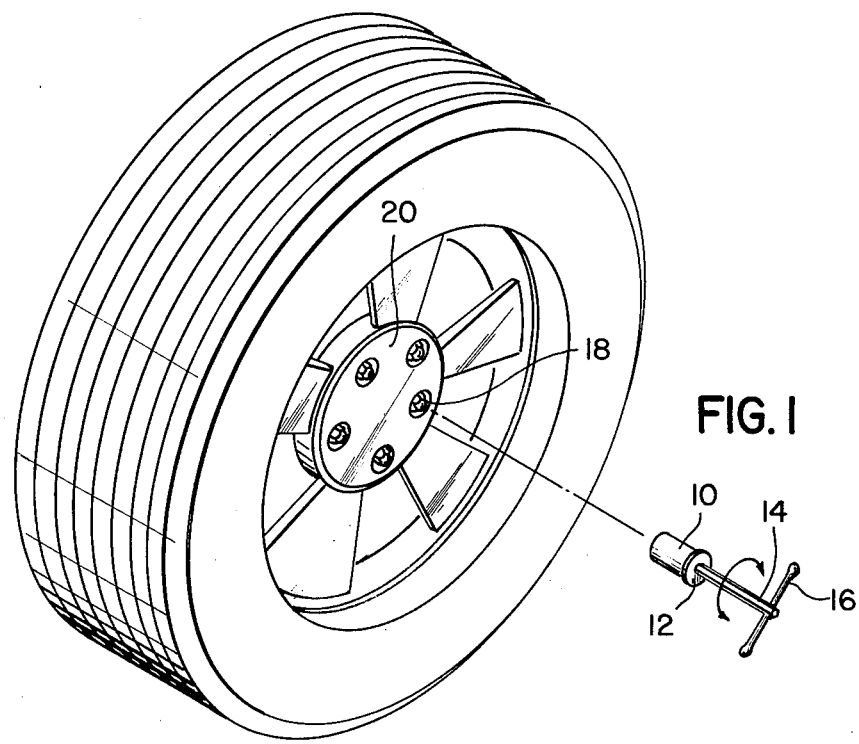
FIG. 1 is a perspective view of the device showing the device engageable with one of the lug nuts.
Figure 2:
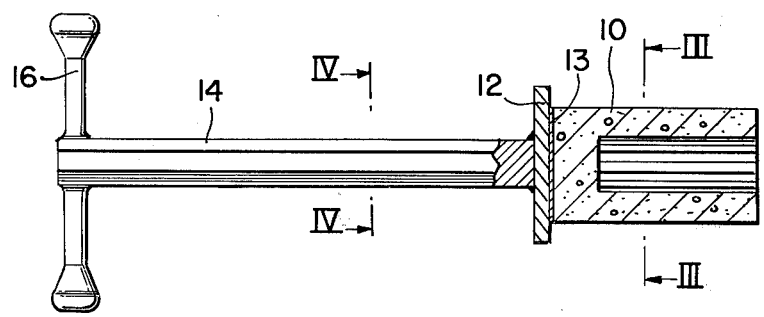
FIG. 2 is a side view in partial section of the device.
Figures 3, 4, 5:
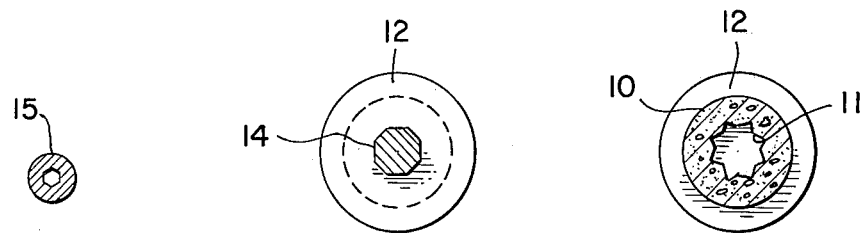
FIG. 3 is a cross sectional view of the device taken along the plane 3—3 of FIG. 2.
FIG. 4 is a cross sectional view of the device taken along the plane 4—4 of FIG. 2.
FIG. 5 shows a cross section of an alternate embodiment of the shaft.

With regard to FIGS. 1, 2, 3, and 4, a sponge body 10 forms an inner shaftway 11 with interior projecting ribs or teeth. The bottom plate 12 has an adhesive material 13 bonded to the bottom surface of the bottom plate 12 to which the sponge body 10 is attached. The shaft 14 may be of hexagonal cross section or may be of round cross section and form a hexagonal central shaftway 15 for lightness of weight without detraction from the strength of the shaft. A cross handle 16 attached perpendicularly to the distal end of the shaft 14 can be used for rotation of the sponge body 10. When the sponge body 10 is rotatingly engaged with the lug nuts 18 of the wheel 20 the debri embedded in the surfaces of the lug nut 18 can be readily removed irregardful of the position of the lug nuts and the difficulty which may be experienced otherwise in reaching the sides of the lug nuts.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A vehicular lug nut cleaning device, comprising:
   a sponge engageable with a lug nut, the sponge forming a shaftway extending from an outer face thereof and engageable with a side of the lug nut,
   the shaftway having interiorly projecting ribs extending inwardly from an inner surface of the shaftway,
   a shaft attached to a bottom plate,
   an adhesive material attached to a bottom of the bottom plate and attached to an inner face of the sponge, whereby the sponge is attached to the shaft, and
   a cross handle attached perperdicularly to a distal end of the shaft for rotating the same.

2. The device of claim 1, wherein the shaft is of hexagonal cross section.

3. The device of claim 1, wherein the shaft is of round cross section and forms a hexagonal central shaftway.

* * * * *